Jan. 3, 1933.   J. G. BROWN   1,893,322
GIN SAW FILING MACHINE ATTACHMENT
Filed Sept. 23, 1930
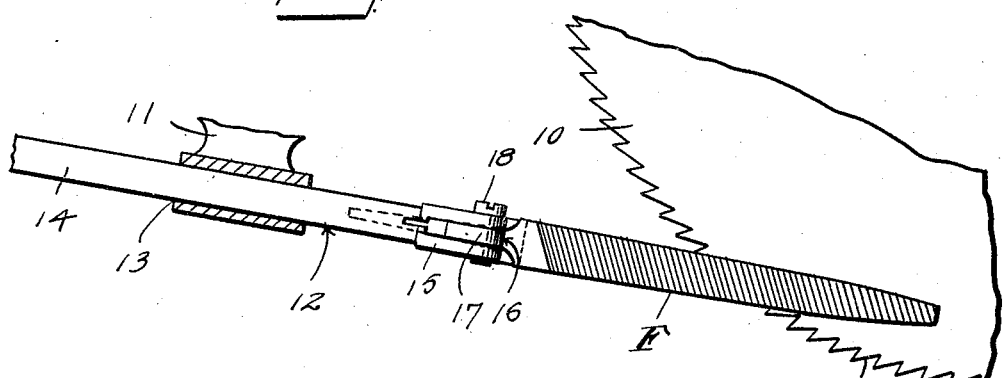
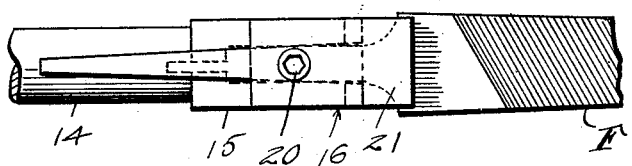
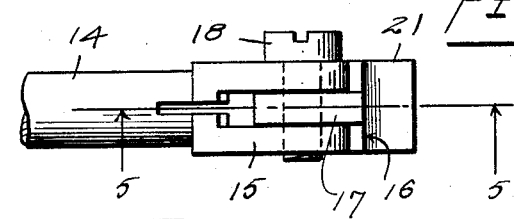
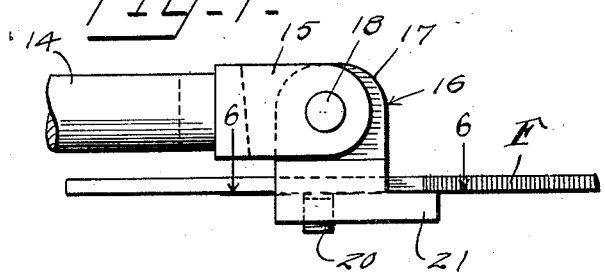
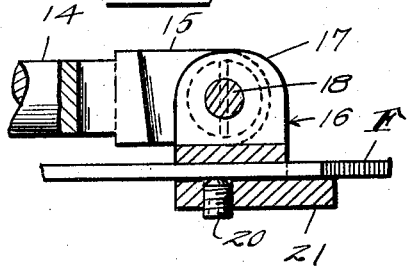
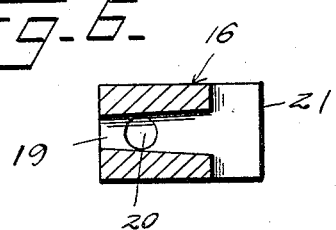
Inventor
J. G. Brown
By Watson E. Coleman
Attorney Patented Jan. 3, 1933

1,893,322

UNITED STATES PATENT OFFICE

JOHN G. BROWN, OF PURCELL, OKLAHOMA

GIN SAW FILING MACHINE ATTACHMENT

Application filed September 23, 1930. Serial No. 483,940.

The present invention relates to saw sharpening devices and more particularly to improvements in a gin saw sharpening machine.

An object of this invention is to provide means by which the saw may be sharpened so as to reproduce the initial bevel or edge on the teeth of the saw.

Another object of this invention is to provide an improved attachment for holding a flat face file which may be angularly adjusted with respect to the plane of the saw so that any desired angle may be formed on the teeth by the filing machine.

The above and various other objects and advantages of this invention will in part be described and in part be understood from the following detailed description of the present preferred embodiment, the same being illustrated in the accompanying drawing wherein:—

Figure 1 is a detail side elevation of an attachment for a saw filing machine constructed according to the preferred embodiment of this invention showing the application on a circular saw which is shown in fragmentary form;

Figure 2 is a fragmentary enlarged side elevation showing the opposite side from that disclosed in Figure 1;

Figure 3 is an enlarged fragmentary side elevation of the attachment without the file positioned thereon;

Figure 4 is a bottom plan view of the device;

Figure 5 is a sectional view taken on the line 5—5 of Figure 3; and

Figure 6 is a sectional view taken on the line 6—6 of Figure 4.

Referring to the drawing wherein like numerals of reference designate corresponding parts throughout the several views, the numeral 10 designates generally a circular saw which is commonly used in cotton gins or the like, and the numeral 11 designates a guide which is secured to a saw filing machine. The guide 11 has an aperture 13 therethrough for slidably receiving a reciprocating sharpening member generally designated as 12, the sharpening member 12 comprising a reciprocating shaft 14 which is secured at one end to the saw filing machine and at the opposite or outer end is provided with a bifurcated head 15 for receiving a file holding member 16. The file holding member is provided with a shank 17 which is adapted to be positioned between the bifurcated end 15 of the shaft 14 and a threaded bolt 18 extends through the bifurcated end 15 of the device and also extends through the shank 17 so as to hold the file holder 16 in adjusted position with respect to the longitudinal plane of the shaft 14.

The file holder 16 is provided with a longitudinally disposed tapering slot 19 which is adapted to receive one end of a flat file F and a set screw 20 is threadably mounted in the file holder 16 and engages against the file F so as to firmly hold the file on the holder 16.

The file holder 16 is provided with an extension 21 at the base thereof which is adapted to support the file F while secured in the file holder 16. The file holder 16 is adapted to be adjusted angularly of the axis of the shaft 14 so that the file F may be adjusted to any desired angle for filing the teeth T of the saw 10.

In the use of this device, the file F may be positioned in the slot 19 of the holder 16 and held in position by means of the set screw 20. The file holder 16 may be adjusted by means of the adjusting bolt 18 so that the file will have the desired inclination with respect to the plane of the saw 10 so that when the filing machine is set in operation, the file F will be reciprocated so as to file the teeth T and form the desired bevel on the outer faces thereof. The bolt 18 may be tightened so as to securely hold the file holder 16 in adjusted position with respect to the saw 10 and the filing machine operated as hereinbefore stated.

It will be obvious from the foregoing that an exceedingly simple attachment has been devised for saw filing machines which will permit the use of flat files instead of three corner files as at present in use and will also support the file so that it will not become broken or bent during the filing operation.

It is, of course, understood that various changes and modifications may be made in the details of construction and design of the above specifically described embodiment of this invention without departing from the spirit thereof, such changes and modifications being restricted only by the scope of the following claim:—

What is claimed is:—

In a saw filing machine, a reciprocal shaft, a bifurcated head carried by the shaft, a file holding member, a shank carried by the member and disposed between the bifurcations of the head, means for securing the shank in adjusted position whereby to dispose the file holding member in adjusted position transverse to the plane of the saw, and an extension carried by the member and engaging one face of a file carried thereby to brace the file secured in the member.

In testimony whereof I hereunto affix my signature.

JOHN G. BROWN.